E. ROSENFELD.
PLOW.
APPLICATION FILED SEPT. 11, 1909.
948,431.
Patented Feb. 8, 1910.
2 SHEETS—SHEET 2.
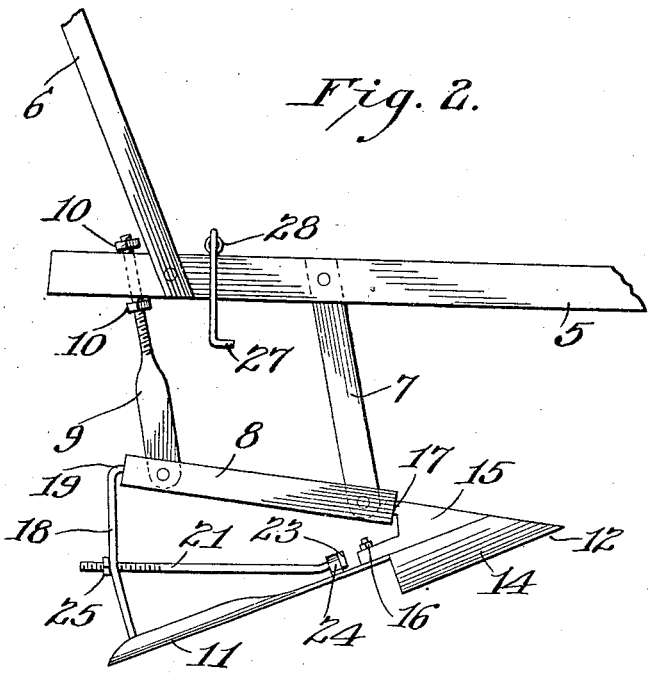
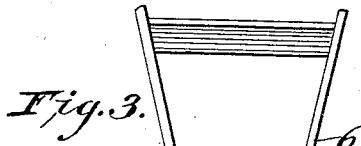
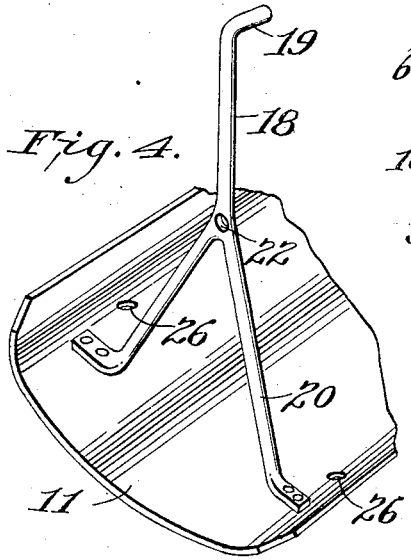
Inventor
Edward Rosenfeld
By Watson E. Coleman
Attorney
Witnesses
M. C. Lyddane
E. M. Ricketts

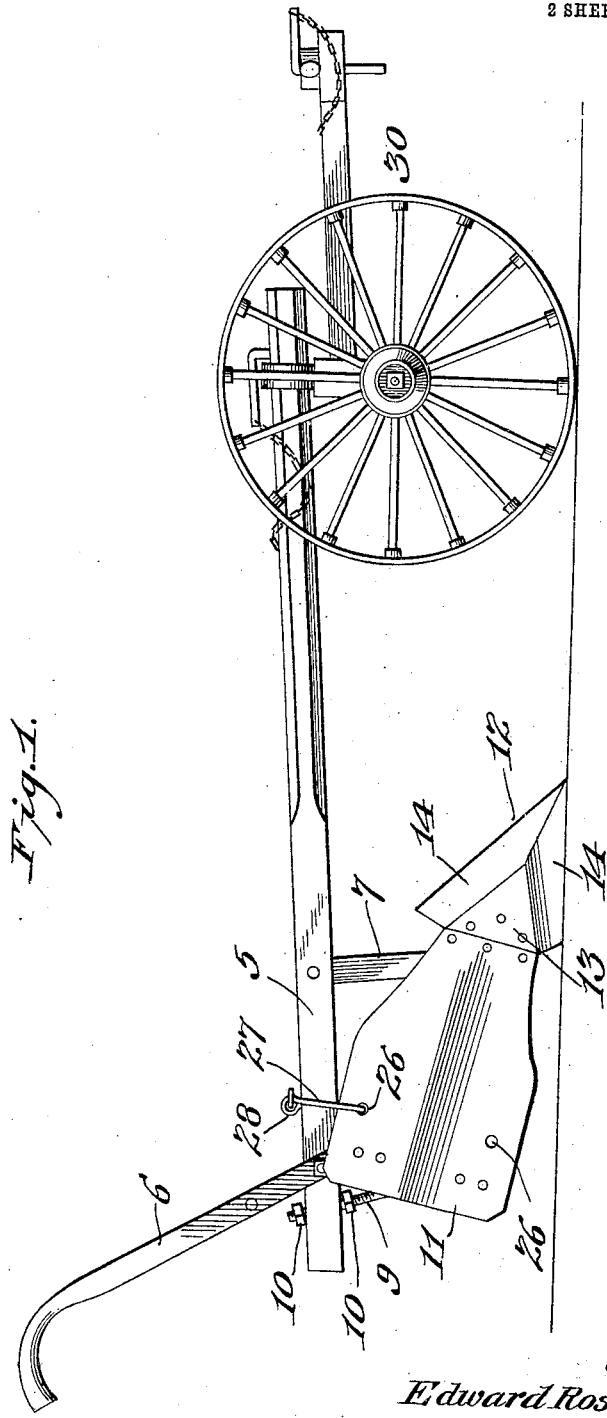

UNITED STATES PATENT OFFICE.

EDWARD ROSENFELD, OF COLUMBUS, OHIO.

PLOW.

948,431.  Specification of Letters Patent.  Patented Feb. 8, 1910.

Application filed September 11, 1909. Serial No. 517,202.

*To all whom it may concern:*

Be it known that I, EDWARD ROSENFELD, a citizen of the United States, residing at Columbus, in the county of Franklin and State of Ohio, have invented certain new and useful Improvements in Plows, of which the following is a specification, reference being had to the accompanying drawings.

This invention relates to certain new and useful improvements in plows and has for its object to provide a plow which will operate with equal facility on level ground or upon a hillside.

Another object is to provide a plow mounted upon a truck said plow being pivotally supported from the plow beam, whereby the direction in which the earth is thrown from the furrow may be reversed at will.

With these and other objects in view the invention consists in the novel combination and arrangement of parts which will be more fully hereinafter described and specifically set forth in the appended claim.

In the accompanying drawings wherein like reference characters designate similar parts, Figure 1 is a side elevation of the plow in working position; Fig. 2 is a similar view showing the manner of attaching the plow to the beam, the plow being in an inoperative position; Fig. 3 is a rear end elevation; Fig. 4 is a fragmentary perspective view of the mold board and the pivoted supporting member; Fig. 5 is a detail perspective view of the plow point.

Referring to the drawings 5 indicates the plow beam and 6 the handles which are secured to the rear end thereof. A hanger 7 depends from the beam 6 at an angle thereto and has its lower end pivotally secured to a longitudinally disposed bar 8. An adjusting bar 9 is also pivoted to the rear end of the bar 8 and has a cylindrical screw threaded portion which extends through the beam 5. Nuts 10 are disposed thereon and bear upon the top and bottom of the beam, thus retaining the bar in its adjusted position.

The plow proper comprises the mold board 11 and the plow point 12. The plow point is formed of a single sheet of metal shaped to provide a base plate 13 and the angularly disposed side flanges 14. These flanges converge to form a substantially V-shaped point which is adapted to enter the soil and throw the same from the furrow upon either side thereof as may be desired by the operator. The plow point and mold board are secured to a block 15 by means of bolts 16 or other analogous fastening devices. The block 15 is formed with a stud 17 which is seated in a socket in the front end of the bar 8, thus permitting of the swinging or pivotal movement of the block and the mold board and plow point secured thereto. The rear end of the mold board is supported from the bar 8 by means of the rod 18. This rod is formed with a lateral extension 19 at its upper end which is pivotally engaged in the rear end of the bar 8. Below its center the rod is branched as shown at 20 and has its extremities secured to the mold board. A brace rod 21 extends through an opening 22 in the supporting rod 18. The inner end of the brace rod is formed with a head 23 engaged with a clip 24 secured to the mold board, through which the rod extends. A nut 25 is threaded upon the outer end of the rod 21 and prevents the displacement of the extension 19 of the supporting rod 18 from the end of the bar 8. Apertures 26 are provided in the opposite sides of the mold board and are adapted to receive the end of a hook rod 27 pivoted in an eye 28 secured in the plow beam. Thus it will be seen that the mold board and plow point may be positioned upon either side of the plow beam as they are rigidly connected and pivotally mounted in the ends of the bar 8, and are securely sustained in this position by means of the hook rod 27. In this manner the earth may be thrown upon either side of the furrow without necessitating the turning of the machine and draft animals.

The forward end of the beam 5 may, if desired, be supported upon a suitable truck 30 as illustrated in Fig. 1 of the drawing.

The foregoing combination of elements defines the plow when arranged in operative position, and after the draft animals have been attached, the plow may be located upon either side of the beam as before described and directed as desired by the operator. By manipulating the nuts 10, the plow point may be introduced into the soil at any angle to a deep furrow or a broad shallow one as circumstances may direct.

From the foregoing it will be seen that I have provided a plow which is simply constructed and may be adjusted to cut a furrow of any depth. It is also equally well adapted to plowing upon a hillside or on level ground, and the pivotal mounting of the plow point and mold board provides a device having a very wide range of utility. It is highly efficient in its operation, of great durability and may be manufactured at a minimum cost.

Having thus described the invention, what is claimed is:

In a plow, the combination with a beam, of a hanger depending from said beam, a longitudinal bar pivotally secured at its forward end to said hanger, an adjusting member pivotally secured to the rear end of said bar having a cylindrical screw-threaded portion vertically movable through said beam, adjusting nuts on said screw threaded portion on opposite sides of the beam, a mold board having a supporting rod secured thereto, the free end of said rod being laterally disposed and pivotally mounted in the rear end of said bar, a substantially triangular shaped block having a stud formed thereon pivotally disposed on the forward end of said bar, a rearwardly extending arm integrally formed with the block, said mold board being secured to the arm at its forward end, a plow point secured to said block having outwardly and upwardly extending angular blades converging to a point beyond the forward end of said block, a longitudinally extending rod rigidly secured at one end of said mold board, the rear end of said rod extending through an aperture in the supporting rod and being provided with screw threads, a nut disposed thereon adapted to bind upon the supporting rod to pivotally dispose said mold board and plow point in the ends of said bar, and a hook carried by said beam adapted for engagement through an aperture in the mold board to support the same upon either side of the beam.

In testimony whereof I hereunto affix my signature in the presence of two witnesses.

EDWARD ROSENFELD.

Witnesses:
MARTIN SHILLING,
EMIDIO ROSSI.